United States Patent [19]

Nomura et al.

[11] Patent Number: 4,912,572
[45] Date of Patent: Mar. 27, 1990

[54] MAGNETIC DISK DRIVE WITH EFFECTIVE AGC CONTROL OF SERVO SIGNALS BY SELECTIVELY VARYING A/D CONVERTER REFERENCE LEVEL

[75] Inventors: Hideo Nomura; Fumio Ogasawara, both of Yokohama, Japan

[73] Assignee: Victor Company of Japan, Ltd., Yokohama, Japan

[21] Appl. No.: 208,435

[22] Filed: Jun. 20, 1988

[30] Foreign Application Priority Data

Jun. 19, 1987 [JP] Japan ................................ 62-152466

[51] Int. Cl.[4] .......................... G11B 5/02; G11B 5/027
[52] U.S. Cl. ......................................... 360/46; 360/67; 360/77.02
[58] Field of Search ....................... 360/32, 46, 65, 67, 360/77.01, 77.02, 77.05, 77.07, 77.08, 77.11

[56] References Cited

FOREIGN PATENT DOCUMENTS

88/02913  4/1988  PCT Int'l Appl. .

Primary Examiner—Vincent P. Canney
Assistant Examiner—David L. Robertson
Attorney, Agent, or Firm—Fleit, Jacobson, Cohn, Price, Holman & Stern

[57] ABSTRACT

A magnetic disk drive provided with a computational control circuit for changing the reference level of the A/D converter so that the outputs of A/D conversion are kept constant at all times, which are obtained from integrated output peak values of the sector servo signals on a track having been read in reading a magnetic disk on which sector servo signals are recorded in advance. For the reference level of the A/D converter, values such that the outputs of the A/D conversion on the innermost and outermost tracks become constant are selected in advance, respectively. Thus, that reference level is obtained on the basis of the above values.

3 Claims, 4 Drawing Sheets

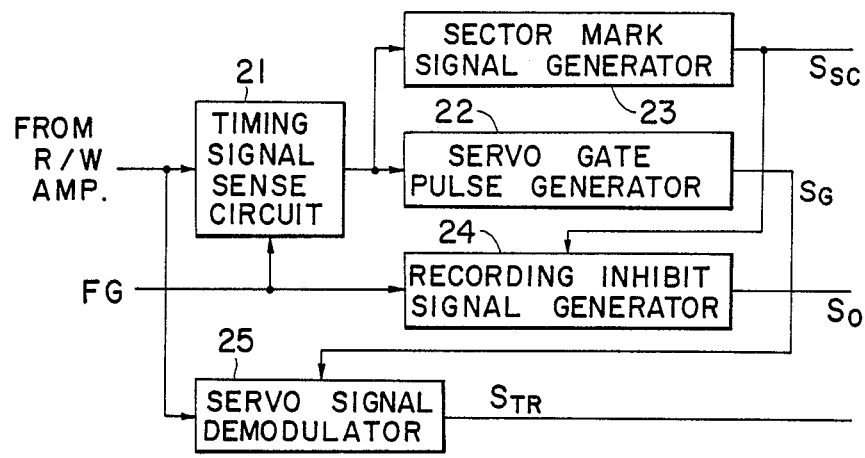
FIG. 3
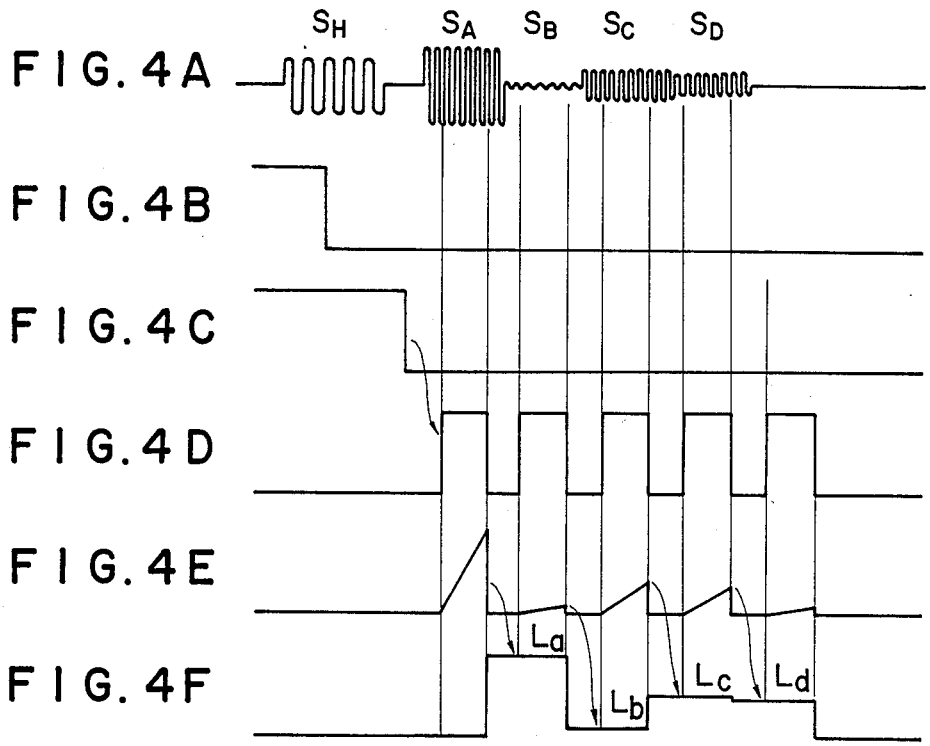

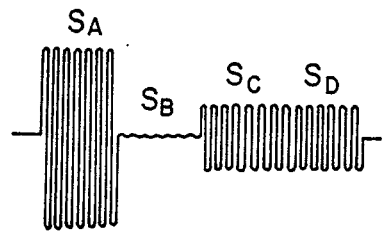
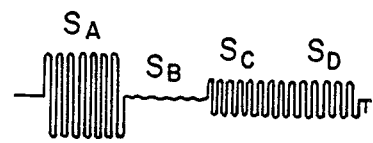
FIG. 5A  FIG. 5B
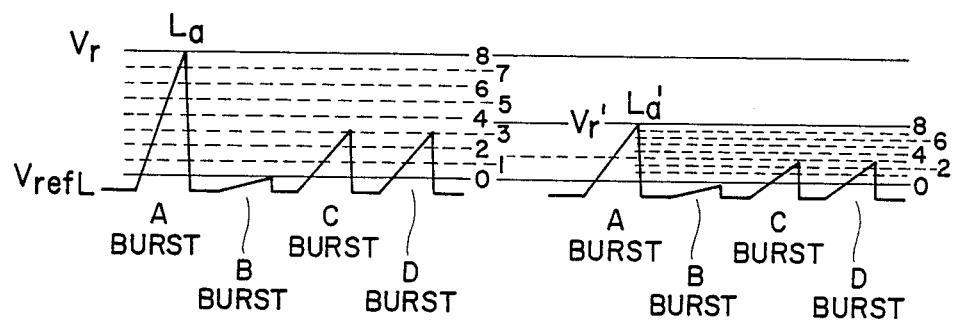
FIG. 5C  FIG. 5D

MAGNETIC DISK DRIVE WITH EFFECTIVE AGC CONTROL OF SERVO SIGNALS BY SELECTIVELY VARYING A/D CONVERTER REFERENCE LEVEL

BACKGROUND OF THE INVENTION

This invention relates to a magnetic disk drive, and more particularly to a magnetic disk drive in which the sector servo system is adopted.

Magnetic disk drives such that various information signals are recorded on a rigid magnetic disk accommodated within a casing and comprising a plurality of sectors forming concentric or helical tracks have been conventionally known. In the drives of this kind, the information signals described above are recorded or reproduced by a magnetic head moved in a radial direction of the magnetic disk rotated at a high speed.

Further, in the drives of this kind, a tracking servo control is carried out so that the magnetic head is made to track precisely with respect to an intended track of the concentric or helical tacks formed on the magnetic disk.

For such a tracking servo control, what is called the sector servo system is generally known.

Namely, in accordance with this sector servo system, servo signals are recorded in advance at head portions of respective sectors in a manner that they are shifted in a radial direction and in a circumferential direction (in a direction of time base) of the magnetic disk, respectively, the tracking servo control is performed so as to compensate an off-track quantity of the magnetic head obtained by comparative computation of reproduced output levels of these servo signals.

Such sector servo system is described in detail, e.g., in Japanese Patent Application No. 123103/1987.

Meanwhile, an error between an off-track quantity calculated and an actual off-track quantity may be produced in the conventional disk drives by the difference between reproduced output levels of the servo signals due to the difference in the magnetic head used, and/or by the difference in track width due to the expansion and contraction of the disk caused by changes in the ambient temperature.

Further, even if the same magnetic head is used, the reproduced output levels of the servo signals change depending upon the difference between the inner tracks and outer tracks of the disk. Also in this case, an error may be produced between an off-track quantity calculated and an actual off-track quantity.

In addition, since the reproduced output levels are different due to the difference in the magnetic head, the difference between the inner tracks and outer tracks of the disk, and the like, the detection sensitivity represented by the output of A/D conversion may vary for the reasons stated above in an apparatus in which an A/D conversion is applied to the reproduced output of the servo signal to calculate an off-track quantity.

They cause hindrance to realization of precise tracking servo control.

SUMMARY OF THE INVENTION

Therefore, an object of this invention is to provide a magnetic disk drive capable of realizing a precise tracking servo even if reproduced output levels of the servo signals change due to various causes, e.g., the difference between inner tracks and outer tracks of the disk, an error between magnetic heads, and the like.

Another object of this invention is to increase the detection sensitivity regarding the output level of A/D conversion based on the reproduced output level of the servo signal.

A magnetic disk drive according to this invention comprises a timing signal generating circuit for sensing from a reproduced output a plurality of sector servo signals prerecorded along tracks on a magnetic disk, an integration circuit for integrating the sector servo signals sensed, respectively, an analog to digital (A/D) converter for digitalizing the peak values of the integrated outputs of the integration circuit, a computational control circuit for sensing reference levels for the A/D converter such that digitalized peak values of predetermined sector servo signals on predetermined tracks positioned at inner and outer circumferences of the magnetic disk become constant, thus to compute optimum reference levels for the A/D converter for the respective tracks on the basis of the reference levels sensed, and a reference level switching circuit for generating a reference level for the A/D converter per each track responsive to a computed result of the computational control circuit.

In accordance with this invention, particularly when servo signals recorded in advance on a magnetic disk are sensed to effect A/D (Analog-Digital) conversion, there is employed an arrangement such that the reference level of the A/D converter is controlled so as to keep the detection sensitivity of the servo signals at constant value at all times. This permits correction of unevenness of reproduced output levels of sector servo signals $S_A$, $S_B$, $S_C$ and $S_D$, i.e., their peak values $L_A$, $L_B$, $L_C$ and $L_D$ due to the inner tracks and outer tracks of the disk. Thus, occurrence of an error due to the difference between inner and outer circumferences between an off-track quantity obtained by calculating these reproduced output levels and an actual off-track quantity can be prevented.

Further, when such a correction is made with respect to every magnetic head, occurrence of an error due to the difference in the magnetic head can be prevented. For example, when correction is made every time the disk drive system is powered, occurrence of an error due to changes in ambient temperature can be also connected.

In addition, when the reproduced output level is low, the detection sensitivity regarding the A/D conversion output can be increased by lowering the reference level as well.

As just described above, this invention can solve the problems with the prior art to realize a precise tracking servo operation.

Other objects and features of this invention will be described with reference to the attached drawings.

BRIEF DESCRIPTION OF THE DRAWINGS

In the drawings:

FIG. 3 is a block diagram showing the arrangement of the timing signal generating circuit in FIG. 1;

FIG. 4 is a timing chart showing the operating state of the magnetic disk drive in FIG. 1;

FIG. 5 is a timing chart for explaining calibration of the A/D converter; and

DETAILED DESCRIPTION OF THE PREFERRED EMBODIMENT

Figure 1:
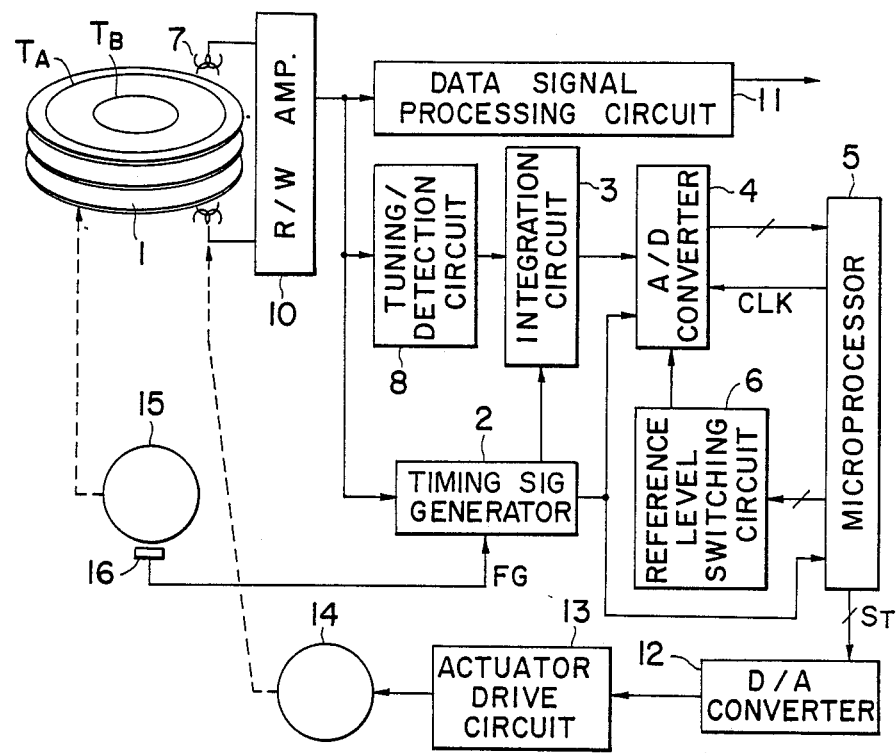
FIG. 1 is a block diagram showing an arrangement of a magnetic disk drive according to this invention.
Figure 2:
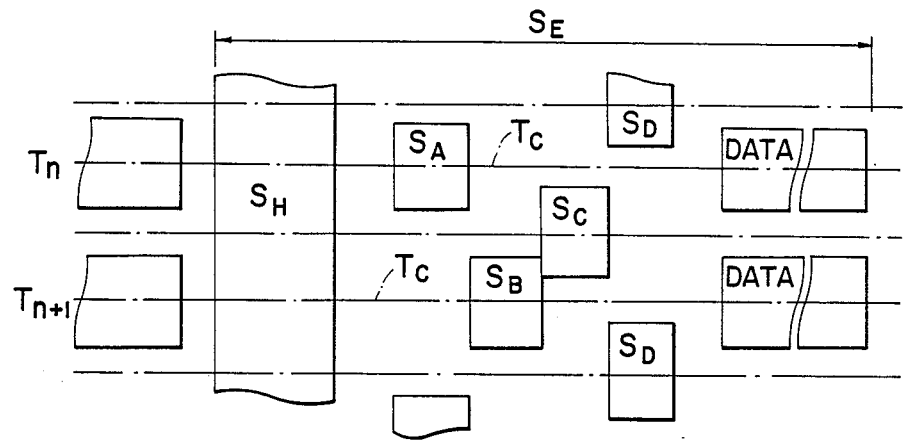
FIG. 2 is a veiw showing, in a model form, a signal pattern of a magnetic disk.

A magnetic disk drive according to this embodiment accommodates a plurality of magnetic disks 1 therein as shown in FIG. 1. On these magnetic disks 1, as shown in FIG. 2, a plurality of sectors SE are recorded in succession. Thus, concentric tracks $T_n$ are formed.

Header signals $S_H$ ranging in a radial direction of the magnetic disk 1 are radially recorded on the head portions of the respective sectors SE. Servo signals $S_A$, $S_B$, $S_C$ and $S_D$ having a single frequency and data signals Data are recorded on the respective sectors SE.

The above-mentioned servo signals $S_A$, $S_B$, $S_C$ and $S_D$ are recorded in advance by a magnetic head 7 for recording and reproducing data at positions ranging over two adjacent tracks $T_n$ and $T_{n+1}$ in the radial direction of the magnetic disk 1 and shifted to each other in a circumferential direction.

Respective servo signals $S_A$, $S_B$, $S_C$ and $S_D$ in this embodiment are arranged and recorded in a manner that when the track $T_n$ is assumed as an even track, servo signal $S_A$ is positioned on the track center $T_c$ of the track $T_n$, and servo signals $S_D$ and $S_C$ are positioned with they being shifted by substantially ½ track width on both the sides (in a traverse (radial) direction) of the servo signal $S_A$, respectively.

In addition, the above-mentioned signals are recorded in a manner that servo signal $S_B$ is positioned on the track center $T_c$ of the odd track $T_{n+1}$, and servo signals $S_C$ and $S_D$ are positioned with they being shifted by substantially ½ track width on both the sides of the servo signal $S_B$, respectively.

Transmission and reception of data signals Data and servo signals $S_A$, $S_B$, $S_C$ and $S_D$, etc. to and from the magnetic disk 1 as described above are carried out by the magnetic head 7 corresponding to each disk 1. These reproduced outputs from the magnetic head 7 as shown in FIG. 4A are delivered to an ordinary data processing circuit 11 through a read/write amplifier 10.

This data processing circuit 11 extracts necessary data signals Data and/or index signals from the reproduced output and processes such signals to deliver the processed data, etc. to a host equipment (not shown) through an interface block (not shown).

On the other hand, the reproduced output from the disk 1 outputted from the read/write amplifier 10 is delivered to an integration circuit 3 via a tuning/detection circuit 8 and to a timing signal generating circuit 2. The tuning/detection circuit 8 is tuned to the single frequency of the servo signals for envelope detecting them.

The timing signal generating circuit 2 is constituted as shown in FIG. 3. A pulse FG in a form of step signal, corresponding to the header signal $S_H$ as shown in FIG. 4B is delivered from a FG sensor 16 coupled to a spindle of a spindle motor 15 to a timing signal sense circuit 21. A blank (signalless) portion between the header signal and the servo signal $S_A$ in the reproduced output similarly delivered to the timing signal sense circuit 21 is sensed on the basis of the FG pulse, thus to generate a blank sense signal as shown in FIG. 4C.

Thus, a servo gate pulse generating circuit 22 generates servo gate pulses $S_G$ as shown in FIG. 4D with a predetermined time delays refered to the blank sense signal.

The output timings of the servo gate pulses $S_G$ are synchronous with respective output timings of the servo signals $S_A$, $S_B$, $S_C$ and $S_D$, and are used for extracting respective servo signals BURST A to D from the reproduced output with the servo gate pulses being as a window at a servo signal demodulator 25.

In the timing signal generating circuit 2, a sector mark signal generator 23 for generating a sector mark signal indicative of the beginning of the data area used for taking out data on the basis of an output of the timing signal sense circuit 21, and a recording inhibit signal generator 24 for generating a recording inhibit signal on the basis of an output of the mark signal generator 23 and an output of the read/write amplifier 10 are also provided.

The above-mentioned servo gate pulses are delivered to the integration circuit 3, and to an A/D converter 4 for which reference level can be adjustably set by a reference level switching circuit 6 and a microprocessor 5 serving as a computational control circuit in this embodiment.

The integration circuit 3 integrates respective servo signals $S_A$, $S_B$, $S_C$ and $S_D$ for time periods corresponding to pulse widths of the servo gate pulses $S_G$ as described above.

Since the above-mentioned servo signals $S_A$, $S_B$, $S_C$ and $S_D$ are shifted to each other in the radial direction of the disk 1 in this embodiment, output levels of the respective servo signals are different in dependence upon an off-track quantity of the magnetic head 7.

Thus, peak levels of integrated values of respective servo signals integrated for the same integration period are different from each other. By making a comparison between those peak levels, an off-track quantity of the magnetic head 7 can be obtained.

Accordingly, the integration circuit 3 effects sampling of the peak levels of integrated values of the servo signals as stated above to deliver the peak values having undergone sampling to the A/D converter 4 as shown in FIG. 4F.

The A/D converter 4 momentarily digitalizes the above-mentioned four peak values to deliver them to the microprocessor 5.

The microprocessor 5 generates such a tracking servo signal $S_T$ to compensate the off-track quantity of the magnetic head 7 on the basis of the peak values $L_a$, $L_b$, $L_c$ and $L_d$ of the respective servo signals $S_A$, $S_B$, $S_C$ and $S_D$, for delivering the tracking servo signal $S_T$ to a D/A (Digital-Analog) converter 12.

The tracking servo signal $S_T$ changed to a corresponding analog signal at the D/A converter 12 is delivered to a head actuator 14 for driving the magnetic head 7 in the radial direction of the magnetic disk 1 through an actuator drive circuit 13. Thus, the head actuator 14 drives the magnetic head 7 in accordance with the tracking servo signal $S_T$ to thereby compensate the off-track quantity.

The head actuator 14 employed in this embodiment is of the ordinary swing arm system using a voice coil.

When the disk drive is powered the microprocessor 5 senses optimum reference levels for the A/D converter such that the output digital values therefrom become constant, which digital values correspond to respective peak values $L_a$ derived from the sector servo signals $S_A$ positioned on the track centers $T_c$ of the even track $T_A$ nearest the outermost periphery of the magnetic disk 1 and of the even track $T_B$ nearest the innermost periphery thereof, thus to calculate optimum reference levels for the A/D converter 4 for respective tracks with a current track number being as $T_n$ on the basis of these reference levels sensed.

Namely, before the A/D conversion the reproduced output levels of servo signals $S_A$, $S_B$, $S_C$ and $S_D$ obtained with the magnetic head 7 being precisely subjected to track with respect to the track $T_A$ on the outermost circumference and the track $T_B$ on the innermost circumference side are such that those on the outer circumference side become larger than those on the inner circumference side as shown in FIG. 5A and FIG. 5B. The integrated outputs of these reproduced outputs are also such that those on the outer circumference side become larger than those on the inner circumference side as shown in FIG. 5C and FIG. 5D.

The peak value $L_a$ of the servo signal $S_A$ on the outer circumference becomes nearly equal to the reference level Vr of the A/D converter 4 and that on the inner circumference becomes smaller than the reference level Vr (e.g., approximately 70%).

The microprocessor 5 lowers the reference level to Vr' (Vr'=Vr·70/100) so that the peak value $L_a$ of the servo signal $S_A$ on the inner circumference side and the reference level Vr are nearly equal to each other. Thus, the output $L_a$ of the A/D converter 4 on the outer circumference side and the output $L_a'$ on the inner circumference side both bocome nearly equal to 100% of the reference level, so that they are equal to each other.

The microprocessor 5 calculates optimum reference levels for respective tracks on the basis of the optimum reference levels obtained by calibration as stated above.

Namely, when optimum reference levels for the track $T_A$ on the innermost circumference side and the track $T_B$ on the outermost circumference side are assumed as $V_{r1}$ and $V_{r2}$, respectively, an optimum reference level $V_{r(n)}$ for a certain track (cylinder) is obtained by linear approximation using the following equation:

$$V_{r(n)} = V_{r1} + \text{int}\left\{ (V_{r2} - V_{r1} + 1) \times \frac{T_n}{T_{max} + 1} \right\}$$

In this equation, $T_{max}$ is a track number of the innermost track and $T_n$ is a track number of a current track. The number of tracks per each side of the disk is $T_{max}+1$ from the track 0 to the innermost track $T_{max}$.

It is to be noted that the optimum reference level is defined as, e.g., a reference level such that the output of the A/D converter of the servo signal $S_B$ becomes maximum (100%) in the case of odd tracks and the output of the A/D converter of the servo signal $S_A$ becomes maximum in the case of even tracks.

The microprocessor 5 calculates an optimum reference level per each magnetic head as stated above to deliver data indicative of an optimum reference level as instructions to the reference level switching circuit 6 depending upon what (number of) track is traced by which magnetic head, the reference level switching circuit 6 generates reference levels for the A/D converter 4 according to the instructions thus the reference levels of the A/D converter 4 are adjustably set.

Figure 6:
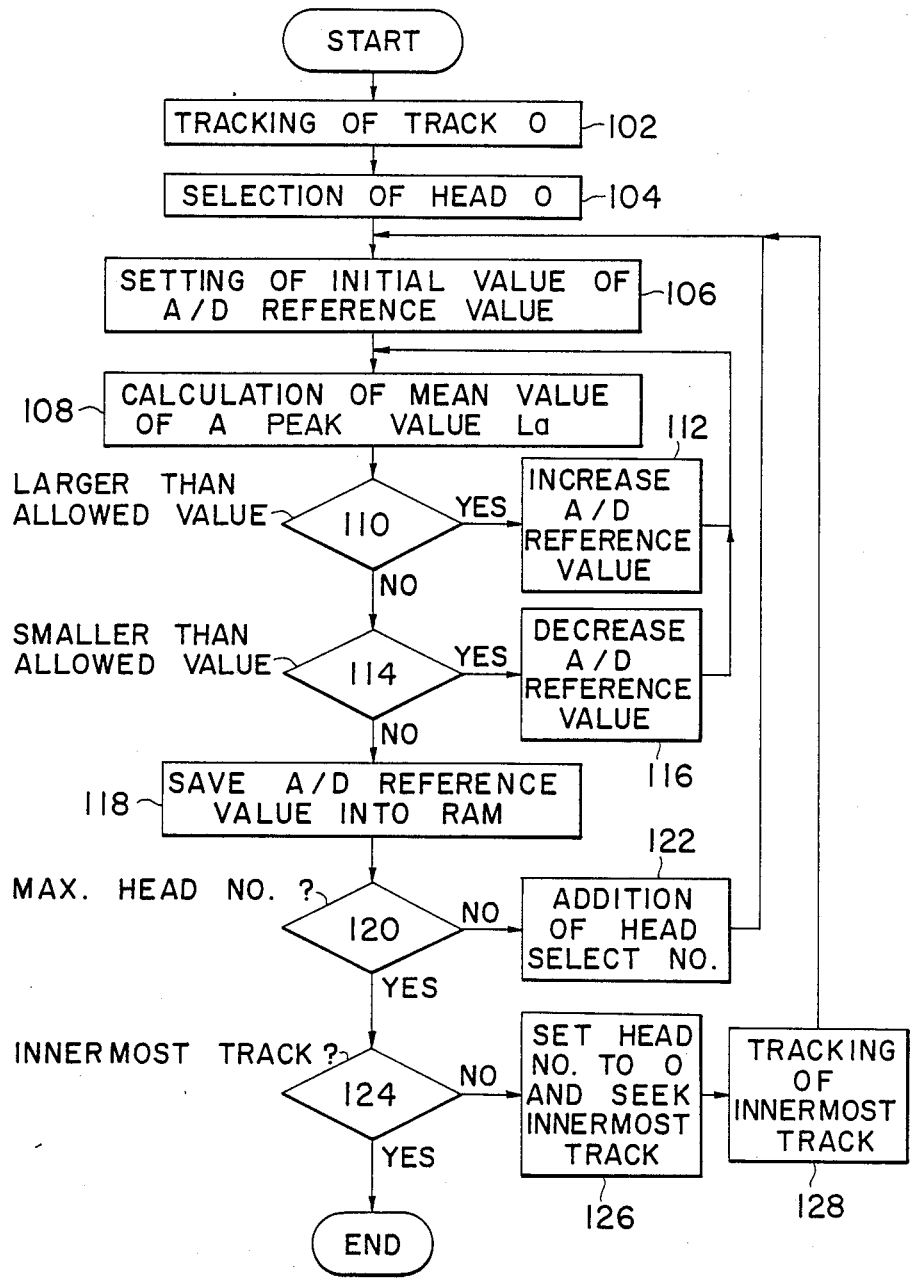
FIG. 6 is a flow chart showing calibration of the A/D converter.

FIG. 6 is a flow chart collectively showing an example of the calibration by the microprocessor 5 for obtaining reference levels for the innermost and outermost circumferential tracks stated above.

First is to effect tracking of the outermost circumferential track 0 (step 102) and to select the head number 0 (step 104). As previously described, the reference value for the A/D converter is set to an initial value which is an intermediate value predetermined in consideration of possible maximum input to the A/D converter (step 106). Then, mean value of the peak value $L_a$ is calculated (step 108) to examine whether or not that value is above an allowed value (step 110). Where that value is above the allowed value, the reference value of the A/D converter is increased (step 112), and the program execution returns to the entrance side of the step 108. In contrast, where that value is not above the allowed value, if it is smaller than the allowed value (step 114), the reference value is decreased (step 116), and the program execution returns to the entrance side of the step 108. When the peak value falls within the allowed range, the reference value of the A/D converter at that time is stored into RAM as a reference value for the outermost track to save it (step 118).

Whether or not the head number is maximum is examined (step 120). Where the head number is not maximum, it shifts to a larger head number (step 122). The processings at the step 106 and those subsequent thereto are repeatedly executed, e.g., for heads 0 to 7. Further, whether or not the track accessed is the innermost track is examined (step 124). As a result, when it is not the innermost circumferential track, the head number is set to zero to seek the innermost track (step 126) to effect tracking of the innermost track (step 128), thus to execute the processings at the step 106 and those subsequent thereto to save a reference value for the innermost track.

Thus, since unevenness of respective servo signals $S_A$, $S_B$, $S_C$ and $S_D$ due to the difference in the magnetic head 7, and the difference between inner and outer tracks can be corrected, it is possible to prevent occurrence of an error between an off-track quantity calculated by the microprocessor 5 and an actual off-track quantity.

Further, since an optimum reference level is calculated every time when powered in this embodiment, occurrence of an error based on changes in the ambient temperature can be prevented.

In addition, where the magnetic head 7 is precisely subject to on-track with respect to the intended track, the A/D conversion output becomes equal to the maximum output (100%) of the A/D converter 4, thus making it possible to increase the detection sensitivity regarding the A/D converter output.

Accordingly, the magnetic disk drive according to this embodiment can realize precise tracking servo control.

What is claimed is:

1. A magnetic disk drive comprising:
   a timing signal generating circuit for sensing from a reproduced output a plurality of sector servo signals prerecorded along tracks on a magnetic disk;
   an integration circuit for integrating said sector servo signals sensed, respectively;
   an analog to digital (A/D) converter for digitalizing the peak values of said integrated outputs of said integration circuit;
   a computational control circuit for sensing reference levels for said A/D converter such that digitalized peak values of predetermined sector servo signals on predetermined tracks positioned at inner and outer circumferences sides of said magnetic disk become constant, thus to compute optimum reference levels for said A/D converter for said respective tracks on the basis of said reference levels sensed; and a reference level switching circuit for generating a reference level for said A/D converter per each track responsive to a computed result of said computational control circuit.

2. A magnetic disk drive as set forth in claim 1, wherein said magnetic disk is further prerecorded with a header signal preceding to and being separated by a blank portion from a series of said sector servo signals and said timing generating circuit comprises a timing signal sense circuit for sensing said blank portion from the reproduced output on the basis of an output from a frequency generator coupled to the motor shaft, and a servo gate pulse generator for generating servo gate pulses for extracting said sector servo signals on the basis of said blank portion sensed by said timing signal sense circuit.

3. A magnetic disk drive as set forth in claim 1, wherein said computational control circuit performs a linear approximation for obtaining a reference value optimum to a track between said predetermined tracks.

* * * * *